(12) United States Patent
Snavely et al.

(10) Patent No.: US 12,450,823 B2
(45) Date of Patent: Oct. 21, 2025

(54) NEURAL DYNAMIC IMAGE-BASED RENDERING

(71) Applicant: Google LLC, Mountain View, CA (US)

(72) Inventors: Keith Noah Snavely, New York, NY (US); Zhengqi Li, Jersey City, NJ (US); Forrester H. Cole, Cambridge, MA (US); Richard Tucker, New York, NY (US); Qianqian Wang, Berkeley, CA (US)

(73) Assignee: Google LLC, Mountain View, CA (US)

( * ) Notice: Subject to any disclaimer, the term of this patent is extended or adjusted under 35 U.S.C. 154(b) by 161 days.

(21) Appl. No.: 18/515,024

(22) Filed: Nov. 20, 2023

(65) Prior Publication Data

US 2025/0157133 A1 May 15, 2025

Related U.S. Application Data

(60) Provisional application No. 63/598,044, filed on Nov. 10, 2023.

(51) Int. Cl.
*G06T 15/20* (2011.01)
*G06T 7/215* (2017.01)
*G06T 11/00* (2006.01)
*G06T 15/06* (2011.01)
*G06V 10/44* (2022.01)
*G06V 10/56* (2022.01)
*H04N 13/117* (2018.01)

(52) U.S. Cl.
CPC .............. *G06T 15/20* (2013.01); *G06T 7/215* (2017.01); *G06T 11/001* (2013.01); *G06T 15/06* (2013.01); *G06V 10/44* (2022.01); *G06V 10/56* (2022.01); *H04N 13/117* (2018.05); *G06T 2207/30241* (2013.01)

(58) Field of Classification Search
None
See application file for complete search history.

(56) References Cited

U.S. PATENT DOCUMENTS

| 10,614,581 | B2 * | 4/2020 | Senthamil | G01C 21/3874 |
| 11,210,859 | B1 * | 12/2021 | Fredericks | G06T 7/62 |
| 2022/0113795 | A1 * | 4/2022 | Eder | G06T 7/11 |
| 2024/0007585 | A1 * | 1/2024 | Assouline | G06V 10/32 |
| 2024/0046516 | A1 * | 2/2024 | Anciukevicius | G06T 7/75 |
| 2025/0085108 | A1 * | 3/2025 | Coimbra De Andrade | G01C 21/1656 |

OTHER PUBLICATIONS

Aguiar et al., "Performance capture from sparse multi-view video," ACM SIGGRAPH 2008 papers, Aug. 2008, pp. 1-10.
Bansal et al., "4D visualization of dynamic events from unconstrained multi-view videos," Proceeding of Computer Vision and Pattern Recognition (CVPR), Jun. 2020, pp. 5366-5375.
Barron et al., "Mip-NeRF 360: Unbounded anti-aliased neural radiance fields," Proceeding of Computer Vision and Pattern Recognition (CVPR), Jun. 2022, pp. 5470-5479.
(Continued)

*Primary Examiner* — Nurun Flora
(74) *Attorney, Agent, or Firm* — Fish & Richardson P.C.

(57) ABSTRACT

Methods, systems, and apparatus, including computer programs encoded on a computer storage medium, for rendering a new image that depicts a scene from a perspective of a camera at a new camera viewpoint at a given time point in a video.

20 Claims, 6 Drawing Sheets

(56) References Cited

OTHER PUBLICATIONS

Bemana et al., "X-fields: Implicit neural view-, light- and time-image interpolation," ACM Transactions on Graphics (TOG), Dec. 2020, 39(6):1-15.

Bi et al., "Neural reflectance fields for appearance acquisition," CoRR, submitted on Aug. 16, 2020, arXiv:2008.03824v2, 11 pages.

Bozic et al., "Deepdeform: Learning non-rigid RGB-D reconstruction with semi-supervised data," Proceeding of Computer Vision and Pattern Recognition (CVPR), Jun. 2020, pp. 7002-7012.

Broxton et al., "Immersive light field video with a layered mesh representation," ACM Transactions on Graphics (TOG), Jul. 2020, 39(4):1-15.

Buehler et al., "Unstructured lumigraph rendering," Proceedings of the 28th annual conference on Computer graphics and interactive techniques, Aug. 2001, pp. 425-432.

Carranza et al., "Free-viewpoint video of human actors," ACM Transactions on Graphics (TOG), Jul. 2003, 22(3):569-577.

Chai et al., "Plenoptic sampling," Proceedings of the 27th Annual Conference on Computer Graphics and Interactive Techniques (SIGGRAPH), Jul. 2000, pp. 307-318.

Charbonnier et al., "Two deterministic half-quadratic regularization algorithms for computed imaging," Proceedings of 1st International Conference on Image Processing, Nov. 1994, pp. 168-172.

Chen et al., "MVSNeRF: Fast generalizable radiance field reconstruction from multi-view stereo," Proceedings of the IEEE/CVF International Conference on Computer Vision, Oct. 10-17, 2021, pp. 14124-14133.

Choi et al., "Extreme view synthesis," Proceeding of International Conference on Computer Vision (ICCV), Oct.-Nov. 2019, pp. 7781-7790.

Debevec et al., "Modeling and rendering architecture from photographs: A hybrid geometry- and image-based approach," Proceedings of the 23rd annual conference on Computer graphics and interactive techniques, Aug. 1996, pp. 11-20.

Dou et al., "Fusion4D: real-time performance capture of challenging scenes," ACM Transaction on Graphics (TOG), Jul. 2016, 35(4):114:1-114:13.

Du et al., "Neural radiance flow for 4d view synthesis and video processing," Proceeding of 2021 IEEE/CVF International Conference on Computer Vision (ICCV), IEEE, Oct. 10-17, 2021, pp. 14304-14314.

Flynn et al., "DeepStereo: Learning to predict new views from the world's imagery," Proceeding of Computer Vision and Pattern Recognition (CVPR), Jun. 2016, pp. 5515-5524.

Flynn et al., "DeepView: View synthesis with learned gradient descent," Proceeding of Computer Vision and Pattern Recognition (CVPR), Jun. 2019, pp. 2367-2376.

Fridovich-Keil et al., "Plenoxels: Radiance fields without neural networks," Proceedings of the IEEE/CVF conference on computer vision and pattern recognition, Jun. 19-24, 2022, pp. 5501-5510.

Gao et al., "Dynamic View Synthesis from Dynamic Monocular Video," CoRR, submitted on May 13, 2021, arXiv:2105.06468v1, 11 pages.

Gao et al., "Dynamic view synthesis from dynamic monocular video," Proceedings of the IEEE/CVF International Conference on Computer Vision, Oct. 11-17, 2021, pp. 5712-5721.

Gao et al., "Monocular dynamic view synthesis: A reality check," CoRR, submitted on Oct. 24, 2022, arXiv:2210.13445c1, 13 pages.

Gortler et al., "The lumigraph," Proceedings of the 23rd annual conference on Computer graphics and interactive techniques (SIGGRAPH 96), Aug. 4-9, 1996, pp. 43-54.

Guo et al., "The relightables: Volumetric performance capture of humans with realistic relighting," ACM Transactions on Graphics (ToG), Nov. 2019, 38(6):1-19.

He et al., "Deep residual learning for image recognition," Proceedings of the IEEE conference on computer vision and pattern recognition, Jun. 27-30, 2016, pp. 770-778.

Hedman et al., "Deep blending for free-viewpoint image-based rendering," ACM Transaction on Graphics (TOG), Nov. 2018, 37(6):1-15.

Hedman et al., "Scalable inside-out image-based rendering," ACM Transactions on Graphics (TOG), Nov. 2016, 35(6):1-11.

Innmann et al., "VolumeDeform: Real-time volumetric non-rigid reconstruction," Proceeding of European Conference on Computer Vision (ECCV), Oct. 11-14, 2016, pp. 1-17.

Jia, "Plücker coordinates for lines in the space," Problem Solver Techniques for Applied Computer Science, Com-S-477/577 Course Handout, Aug. 30, 2020, 11 pages.

Kalantari et al., "Learning-based view synthesis for light field cameras," ACM Transaction on Graphics, Nov. 2016, 35(6):1-10.

Kanade et al., "Virtualized reality: Constructing virtual worlds from real scenes," IEEE multimedia, Jan. 1997, 4(1):34-47.

Kasten et al., "Layered neural atlases for consistent video editing," ACM Transactions on Graphics (TOG), Dec. 2021, 40(6):1-12.

Ke et al., "Mask transfiner for high-quality instance segmentation," Proceedings of the IEEE/CVF Conference on Computer Vision and Pattern Recognition, Jun. 19-24, 2022, pp. 4412-4421.

Kingma et al., "Adam: A method for stochastic optimization," CoRR, submitted on Dec. 22, 2014, arXiv:1412.6980v1, 9 pages.

Kopf et al., "First-person hyper-lapse videos," ACM Transactions on Graphics (TOG), Jul. 27, 2014, 33(4):1-10.

Kopf et al., "Robust consistent video depth estimation," Proceedings of the IEEE/CVF Conference on Computer Vision and Pattern Recognition, Jun. 20-25, 2021, pp. 1611-1621.

Levoy et al., "Light field rendering," Proceedings of the 23rd annual conference on Computer graphics and interactive techniques, Aug. 1, 1996, pp. 31-42.

Li et al., "Infinitenature-zero: Learning perpetual view generation of natural scenes from single images," Proceeding of European Conference on Computer Vision, Oct. 23-27, 2022, pp. 515-534.

Li et al., "Learning the depths of moving people by watching frozen people," In Proc. Computer Vision and Pattern Recognition (CVPR), Jun. 2019, pp. 4521-4530.

Li et al., "Neural 3D video synthesis from multi-view video," Proceedings of the IEEE/CVF Conference on Computer Vision and Pattern Recognition, Jun. 18-24, 2022, pp. 5521-5531.

Li et al., "Neural Scene Flow Fields for Space-Time View Synthesis of Dynamic Scenes," CoRR, submitted on Apr. 21, 2021, arXiv:2011.13084v3, 11 pages.

Li et al., "Neural scene flow fields for space-time view synthesis of dynamic scenes," Proceedings of Computer Vision and Pattern Recognition (CVPR), Jun. 2021, pp. 6498-6508.

Lin et al., "Deep 3D mask volume for view synthesis of dynamic scenes," Proceeding of International Conference on Computer Vision (ICCV), Oct. 10-17, 2021, pp. 1749-1758.

Liu et al., "Neural rays for occlusion-aware image-based rendering," Proceedings of the IEEE/CVF Conference on Computer Vision and Pattern Recognition, Jun. 19-24, 2022, pp. 7824-7833.

Liu et al., "Neural sparse voxel fields," Advances in Neural Information Processing Systems, Jul. 22, 2020, 33:15651-15663.

Lombardi et al., "Neural volumes: Learning dynamic renderable volumes from images," ACM Transaction on Graphics (TOG), Jul. 2019, 38(4):65:1-65:14.

Loper et al., "SMPL: A skinned multiperson linear model," ACM transactions on graphics (TOG), Nov. 2015, 34(6):248.1-248.16.

Lu et al., "Layered neural rendering for retiming people in video," ACM Transaction on Graphics (TOG), Dec. 2020, 39(6):256:1-256:14.

Lu et al., "Omnimatte: Associating objects and their effects in video," Proceeding of Computer Vision and Pattern Recognition (CVPR), Jun. 2021, pp. 4507-4515.

Luo et al., "Consistent video depth estimation," ACM Transactions on Graphics (ToG), Jul. 2020, 39(4):71-1.

Martin-Brualla et al., "NeRF in the wild: Neural radiance fields for unconstrained photo collections," Proceeding of Computer Vision and Pattern Recognition (CVPR), Jun. 2021, pp. 7210-7219.

Mildenhall et al., "NeRF: Representing scenes as neural radiance fields for view synthesis," Proceeding of European Conf. on Computer Vision (ECCV), Nov. 3, 2020, pp. 405-421.

(56) References Cited

OTHER PUBLICATIONS

Muller et al., "Instant neural graphics primitives with a multiresolution hash encoding," CoRR, submitted on May 4, 2022, arXiv:2201.05989v2, 15 pages.
Newcombe et al., "DynamicFusion: Reconstruction and tracking of non-rigid scenes in real-time," Proceeding of Computer Vision and Pattern Recognition (CVPR), Jun. 2015, pp. 343-352.
Niemeyer et al., "Differentiable volumetric rendering: Learning implicit 3D representations without 3D supervision," Proceedings of the IEEE/CVF Conference on Computer Vision and Pattern Recognition, Jun. 13-19, 2020, pp. 3504-3515.
Park et al., "HyperNeRF: A higherdimensional representation for topologically varying neural radiance fields," CoRR, submitted on Sep. 10, 2021, arXiv:2106.13228v2, 16 pages.
Park et al., "Nerfies: Deformable neural radiance fields," Proceedings of the IEEE/CVF International Conference on Computer Vision, Oct. 10-17, 2021, pp. 5865-5874.
Peng et al., "Neural body: Implicit neural representations with structured latent codes for novel view synthesis of dynamic humans," Proceedings of the IEEE/CVF Conference on Computer Vision and Pattern Recognition, Jun. 20-25, 2021, pp. 9054-9063.
Penner et al., "Soft 3d reconstruction for view synthesis," ACM Transactions on Graphics (TOG), Nov. 2017, 36(6):235.1-235.11.
Poole et al., "Dreamfusion: Text-to-3d using 2d diffusion," CoRR, submitted on Sep. 29, 2022, arXiv:2209.14988v1, 18 pages.
Pumarola et al., "D-NeRF: Neural radiance fields for dynamic scenes," In Proceedings of the IEEE/CVF Conference on Computer Vision and Pattern Recognition, Jun. 20-25, 2021, pp. 10318-10327.
Ranftl et al., "Towards robust monocular depth estimation: Mixing datasets for zero-shot cross-dataset transfer," IEEE Transactions on Pattern Analysis and Machine Intelligence, Mar. 2022, 44(3):1623-1637.
Riegler et al., "Free view synthesis," Proceeding of European Conf. on Computer Vision (ECCV), Nov. 13, 2020, pp. 623-640.
Riegler et al., "Stable view synthesis," Proceedings of the IEEE/CVF Conference on Computer Vision and Pattern Recognition, Jun. 20-25, 2021, pp. 12216-12225.
Saito et al., "PIFu: Pixel-aligned implicit function for high-resolution clothed human digitization," Proceedings of the IEEE/CVF International Conference on Computer Vision, Oct. 27, 2019-Nov. 2, 2019, pp. 2304-2314.
Schonberger et al., "Structurefrom-motion revisited," Proceeding of Computer Vision and Pattern Recognition (CVPR), Jun. 2016, pp. 4104-4113.
Shum et al., "A Review of image-based rendering techniques," Visual Communications and Image Processing 2000, May 30, 2000, pp. 2-13.
Sitzmann et al., "Deepvoxels: Learning persistent 3D feature embeddings," Proceeding of Computer Vision and Pattern Recognition (CVPR), Jun. 2019, pp. 2437-2446.
Sitzmann et al., "Implicit neural representations with periodic activation functions," Advances in Neural Information Processing Systems, Dec. 6, 2020, 33(626):7462-7473.
Sitzmann et al., "Scene representation networks: Continuous 3D-structureaware neural scene representations," In Neural Information Processing Systems, Dec. 2019, pp. 1119-1130.
Song et al., "NeRFPlayer: A streamable dynamic scene representation with decomposed neural radiance fields," CoRR, submitted on Oct. 28, 2022, arXiv:2210.15947v1, 15 pages.
Srinivasan et al., "Pushing the boundaries of view extrapolation with multiplane images," Proceeding of Computer Vision and Pattern Recognition (CVPR), Jun. 2019, pp. 175-184.
Stich et al., "View and time interpolation in image space," Computer Graphics Forum, Oct. 2008, 27(7):1781-1787.
Suhail et al., "Light field neural rendering," Proceeding of Computer Vision and Pattern Recognition (CVPR), Jun. 2022, 8269-8279.
Tancik et al., "Fourier features let networks learn high frequency functions in low dimensional domains," Advances in Neural Information Processing Systems, Apr. 2020, 33:7537-7547.
Teed et al., "RAFT: Recurrent all-pairs field transforms for optical flow," Proceeding of European Conference on Computer Vision (ECCV), Nov. 3, 2020, 12347(1):402-419.
Tretschk et al., "Nonrigid neural radiance fields: Reconstruction and novel view synthesis of a dynamic scene from monocular video," Proceedings of the IEEE/CVF International Conference on Computer Vision, Oct. 10-17, 2021, pp. 12959-12970.
Ulyanov et al., "Instance normalization: The missing ingredient for fast stylization," CoRR, submitted on Sep. 20, 2016, arXiv:1607.08022v2, 6 pages.
Wang et al., "Fourier plenoctrees for dynamic radiance field rendering in real-time," Proceedings of the IEEE/CVF Conference on Computer Vision and Pattern Recognition, Jun. 18-24, 2022, pp. 13524-13534.
Wang et al., "Ibrnet: Learning multi-view image-based rendering," Proceedings of the IEEE/CVF conference on computer vision and pattern recognition, Jun. 19-25, 2021, pp. 4690-4699.
Wang et al., "Neural prior for trajectory estimation," Proceedings of the IEEE/CVF Conference on Computer Vision and Pattern Recognition, Jun. 2022, pp. 6532-6542.
Wang et al., "Neural trajectory fields for dynamic novel view synthesis," CoRR, submitted on May 12, 2021, arXiv:2105.05994v1, 12 pages.
Weng et al., "HumanNeRF: Free-viewpoint rendering of moving people from monocular video," Proceedings of the IEEE/CVF Conference on Computer Vision and Pattern Recognition, Jun. 2022, pp. 16210-16220.
Wizadwongsa et al., "NeX: Real-time view synthesis with neural basis expansion," Proceedings of the IEEE/CVF Conference on Computer Vision and Pattern Recognition, Jun. 2021, pp. 8534-8543.
Wu et al., "D2NeRF: Self-supervised decoupling of dynamic and static objects from a monocular video," CoRR, Submitted on May 31, 2022, arXiv:2205.15838v1, 20 pages.
Xian et al., "Space-time neural irradiance fields for free-viewpoint video," Proceedings of the IEEE/CVF Conference on Computer Vision and Pattern Recognition, Jun. 20-25, 2021, pp. 9421-9431.
Yoon et al., "Novel view synthesis of dynamic scenes with globally coherent depths from a monocular camera," Proceeding of Computer Vision and Pattern Recognition (CVPR), Jun. 2020, pp. 5336-5345.
Zhang et al., "Consistent depth of moving objects in video," ACM Transactions on Graphics (TOG), Aug. 2021, 40(4):148:1-148:12.
Zhang et al., "Editable free-viewpoint video using a layered neural representation," ACM Transactions on Graphics (TOG), Aug. 2021, 40(4):149:1-149:18.
Zhang et al., "Structure and motion from casual videos," European Conference on Computer Vision, Oct. 23, 2022, pp. 20-37.
Zhang et al., "The unreasonable effectiveness of deep features as a perceptual metric," Proceeding of Computer Vision and Pattern Recognition (CVPR), Jun. 2018, pp. 586-595.
Zhou et al., "Stereo magnification: learning view synthesis using multiplane images," ACM Transactions on Graphics (TOG), Aug. 2018, 37(4):65:1-65:12.
Zitnick et al., "High-quality video view interpolation using a layered representation," ACM Transaction on Graphics (TOG), Aug. 2004, 23(3):600-608.
Zollhöfer et al., "Real-time non-rigid reconstruction using an RGB-D camera," ACM Transactions on Graphics (ToG), Jul. 27, 2014, 33(4):1-12.

\* cited by examiner

NEURAL DYNAMIC IMAGE-BASED RENDERING

CROSS-REFERENCE TO RELATED APPLICATION

This application claims priority to U.S. Provisional Application No. 63/598,044, filed on Nov. 10, 2023. The disclosure of the prior application is considered part of and is incorporated by reference in the disclosure of this application.

BACKGROUND

This specification relates to synthesizing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

SUMMARY

This specification describes a system implemented as computer programs on one or more computers in one or more locations that synthesizes images of a scene in an environment.

Throughout this specification, a "scene" can refer to, e.g., a real world environment, or a simulated environment (e.g., a computer simulation of real-world environment, e.g., such that the simulated environment is a synthetic representation of a real-world scene).

An "embedding" of an entity can refer to a representation of the entity as an ordered collection of numerical values, e.g., a vector, matrix, or other tensor of numerical values.

The subject matter described in this specification can be implemented in particular embodiments so as to realize one or more of the following advantages.

Some existing neural image rendering techniques can perform photo-realistic reconstruction and novel view synthesis given a set of camera images of a scene. However, these existing techniques are generally only applicable for static scenes. Instead, this specification describes techniques for synthesizing novel views from a video, e.g., a monocular video, depicting a complex dynamic scene. Thus, synthesizing a novel view at a given time point requires accurately modeling the motion of dynamic objects within the dynamic scene as well as accurately modeling the appearance of both static and dynamic objects from the novel viewpoint.

While some existing approaches have attempted to perform this task, these existing approaches, e.g., those based on temporally varying Neural Radiance Fields (NeRFs), can produce blurry or inaccurate renderings for long videos with complex object motions and uncontrolled camera trajectories, hampering their use in real-world applications.

Instead of encoding the entire dynamic scene within the weights of MLPs as done by temporally varying NeRFs, this specification presents a new approach that addresses these limitations by adopting a volumetric image-based rendering framework that synthesizes new viewpoints by aggregating features from nearby views in a scene motion-aware manner.

The described techniques retain the advantages of prior methods in their ability to model complex scenes and view-dependent effects, but also enables synthesizing photo-realistic novel views from long videos featuring complex scene dynamics with unconstrained camera trajectories.

The details of one or more embodiments of the subject matter of this specification are set forth in the accompanying drawings, and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
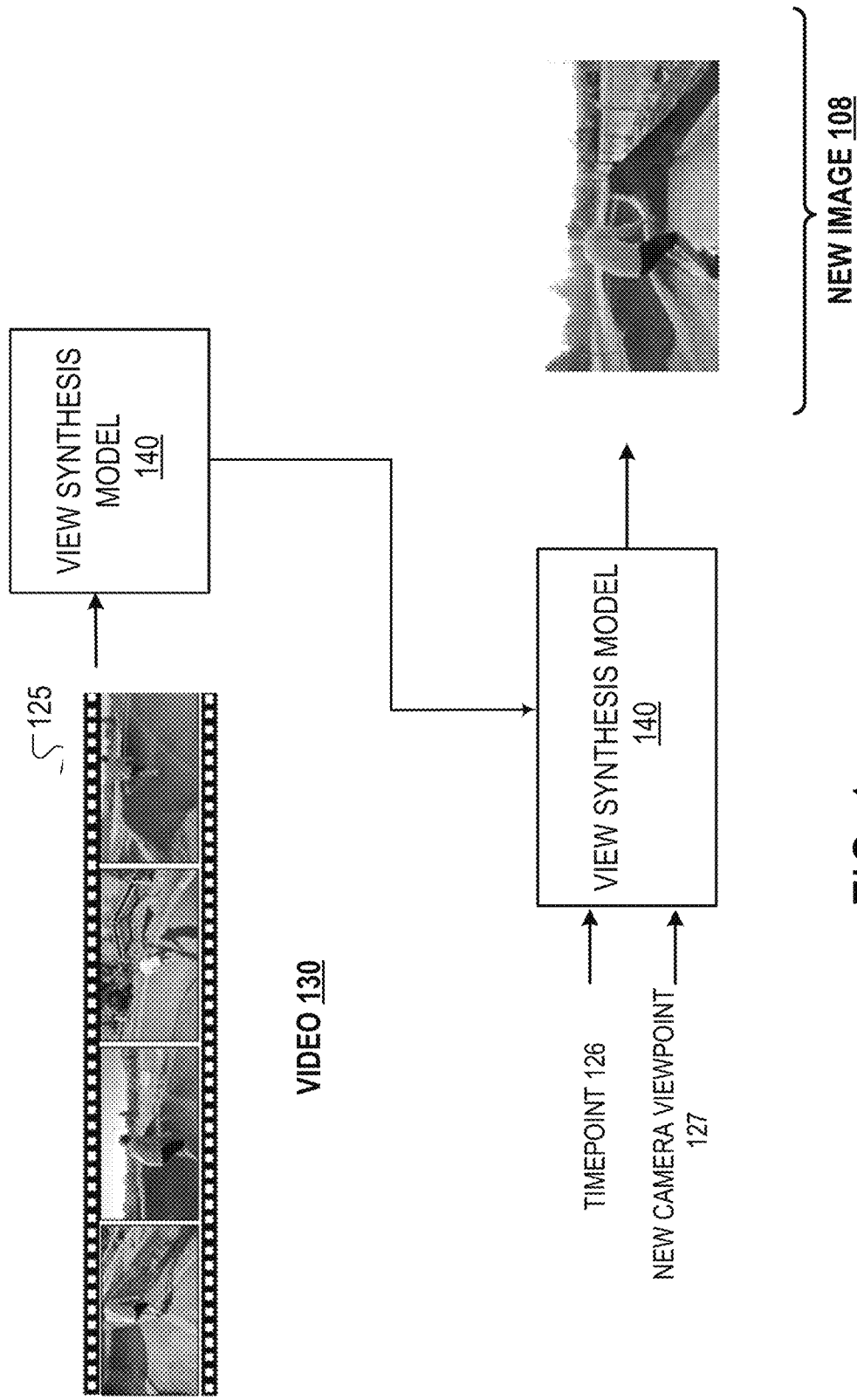
FIG. 1 is a block diagram of an example image rendering system.

FIG. 1 is a block diagram of an example image rendering system 100 that can render ("synthesize") a new image 108 that depicts a scene 125 from a perspective of a camera at a particular viewpoint 127 at a particular time 126 in an input video 130.

The image rendering system 100 is an example of a system implemented as computer programs on one or more computers in one or more locations in which the systems, components, and techniques described below are implemented.

An "image" can generally be represented, e.g., as an array of "pixels," where each pixel is associated with a respective point in the image (i.e., with a respective point in the image plane of the camera) and corresponds to a respective vector of one or more numerical values representing image data at the point. For example, a two-dimensional (2D) RGB image can be represented by a 2D array of pixels, where each pixel is associated with a respective three-dimensional (3D) vector of values representing the intensity of red, green, and blue color at the point corresponding to the pixel in the image.

Throughout this specification, a "scene" can refer to, e.g., a real-world environment, or a simulated environment. For example, as illustrated in FIG. 1, the scene 125 can include various geometric objects in a simulated environment.

In particular, the system 100 receives an input video 130 that includes a respective image at each of a plurality of time points.

The system 100 uses the input video 130 to train a view synthesis model 140. The view synthesis model 140 is a machine learning model that, given a time point in the video 130 and a camera viewpoint, renders an image of the scene 125 at the time point in the video that appears to be an image taken by a camera located at the camera viewpoint. As will be described below, the view synthesis model 140 is generally a collection of multiple neural networks that collectively generate the color, e.g., the RGB color, of each pixel of an output image.

A camera "viewpoint" can refer to, e.g., a location and/or an orientation of the camera within the scene 125. A location of a camera can be represented, e.g., as a three-dimensional vector indicating the spatial position of the camera. The orientation of the camera can be represented using, e.g., a set of one or more Euler angles like the yaw, pitch, and roll of the camera.

That is, when the camera viewpoint is the same as the camera viewpoint of the existing image in the video 130 at the given time point, the image generated by the view synthesis model 140 is a reconstruction of the existing image in the video 130 given the other images in the video.

When the camera viewpoint is a novel viewpoint, i.e., a viewpoint that is different from the viewpoint of the existing image in the video 130 at the given time point, however, the image generated by the view synthesis model 140 is a prediction of what the scene 125 would look like had the camera been located at the novel viewpoint at the given time point.

After the system 100 has trained the view synthesis model 140 on the images in the video 130, the system 100 receives a query that specifies a time point 126 and a new camera viewpoint 127.

The system 100 then uses the trained view synthesis model 140 to render a new image 108 of the scene 125 at the specified time point 126 and from the new camera viewpoint 127.

As will be described in more detail below, the time point 126 can be an existing time point within the video or can be a "fractional time," i.e., a time that is between two existing time points within the video.

For example, the system 100 can synthesize new images as part of generating a computer simulation of a real-world environment being navigated through by a robot or a simulated autonomous vehicle that includes dynamic objects. For example, the synthesized images can ensure the simulation includes images that are similar to those encountered in the real-world environment but capture novel views of the scene that aren't available in videos of the real-world environment. More generally, the simulation can be part of testing the control software of a real-world autonomous vehicle or robot before the software is deployed on-board the autonomous vehicle or robot, of training one or more machine learning models that will later be deployed on-board the autonomous vehicle or robot, or both.

As another example, the synthesized images can be used to augment a training data set that is used to train one or more machine learning models that will later be deployed on-board the autonomous vehicle or robot.

As yet another example, the synthesized images can be generated and displayed to users in a user interface to allow users to view environments from different perspective locations and camera viewpoints. For example, the system 100 can provide the video 130 but with the new image 108 (and optionally additional new images from new camera viewpoints) included in the video 130 instead of the corresponding existing image (when the time point 126 is an existing time point within the video) or in addition to the corresponding existing images in the video 130 (when the time point 126 is a fractional time point).

In another example, the image rendering system 100 can be used to render images of a virtual reality environment, e.g., implemented in a virtual reality headset or helmet. For example, in response to receiving a request from a user to view the virtual reality environment from a different perspective at a given time point, the image rendering system can render a new image of the virtual reality environment from the desired perspective and provide it to the user.

As another example, the image rendering system 100 can be used as part of a video editing and/or enhancement software tool that allows users to modify input videos. For instance, the system 100 can be used to receive a shaky video and re-render the shaky video along a smooth camera path to generate a more stable video. As another example, the system 100 can be used to generate a stereoscopic video from an input monocular video. As another example, the system 100 can be used to generate a narrow depth of field video synthetically.

Figure 2:
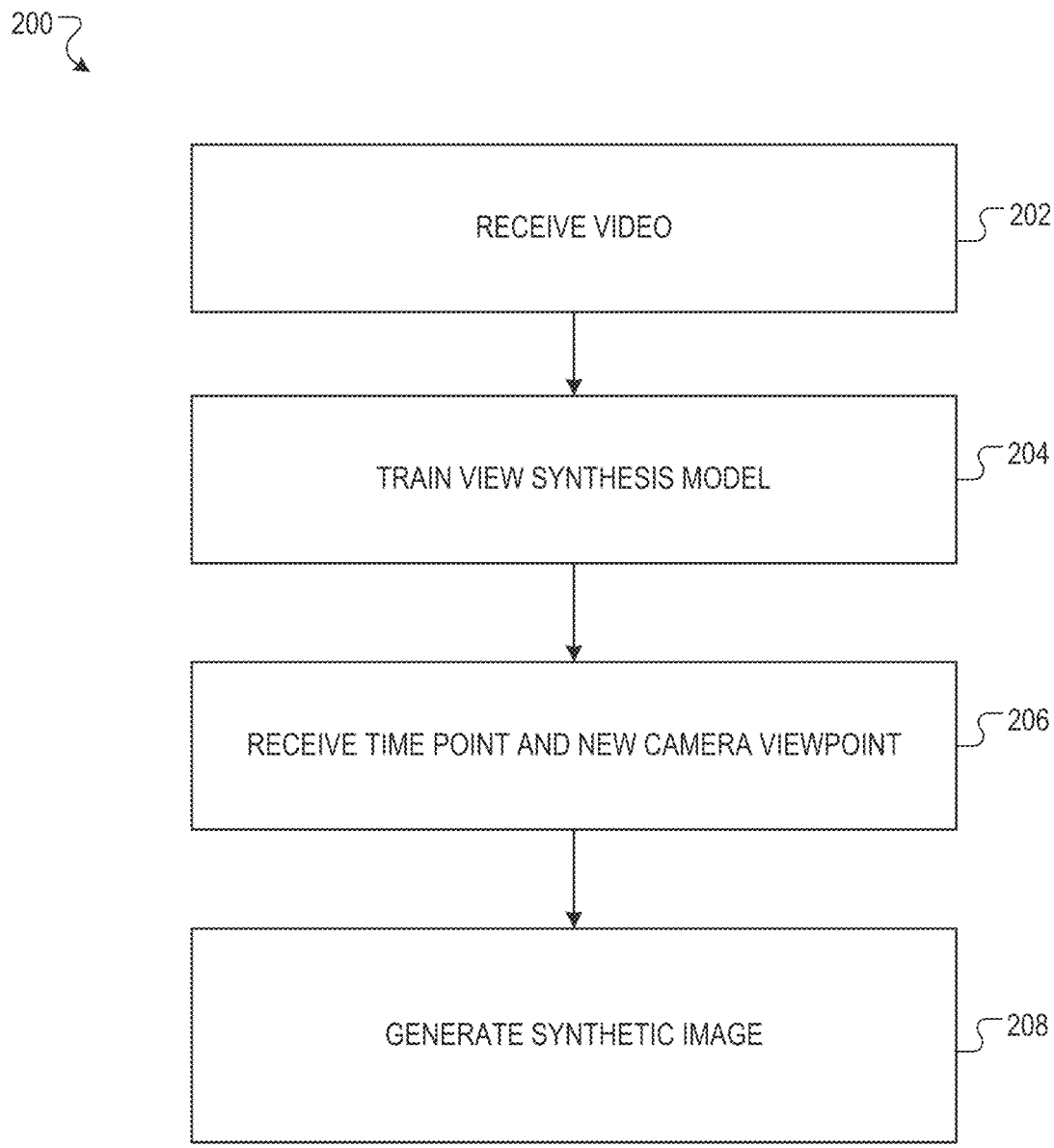
FIG. 2 is a flow diagram of an example process for rendering a new image using a view synthesis model.

FIG. 2 is a flow diagram of an example process 200 for rendering a new image. For convenience, the process 200 will be described as being performed by a system of one or more computers located in one or more locations. For example, an image rendering system, e.g., the system 100 in FIG. 1, appropriately programmed in accordance with this specification, can perform the process 200.

The system receives a video that includes a respective image ("video frame") at each of multiple time points (step 202). That is, the video is a temporal sequence of images.

The system also obtains, for each image in the video, the camera parameters of the camera that captured the video at the time point at which the image was taken. The camera parameters can include, e.g., the position and orientation of the camera when the image was taken, the focal length of the camera, and so on. The system can receive "known" camera parameters as input or can extract the camera parameters by applying a Structure-from-Motion (SfM) technique to the images. One example of an SfM package that can be used by the system to process the images in the video to extract the camera data is the COLMAP package.

The system trains a view synthesis model using the video (step 204). That is, the system trains the view synthesis model on the video so that the view synthesis model can accurately reconstruct any given image in the video given the other images in the video.

Training the view synthesis model is described in more detail below with reference to FIG. 5.

The system receives data specifying a time point and a new camera viewpoint (step 206). For example, the input specifies one of the time points in the video but a new camera viewpoint for the time point that is different from the viewpoint of the camera when the existing image at the time point was taken. As another example, the input specifies a fractional time point that is between two of the time points in the video and a new camera viewpoint for the fractional time point.

The system uses the trained view synthesis model to generate a new synthesized image (step 208). The new synthesized image is a prediction of, given the other images in the video, the image that would appear in the video at the specified time point if the camera were located at the new camera viewpoint.

Using the trained view synthesis model to generate the new synthesized image is described in more detail below with reference to FIGS. 3-5.

Figure 3:
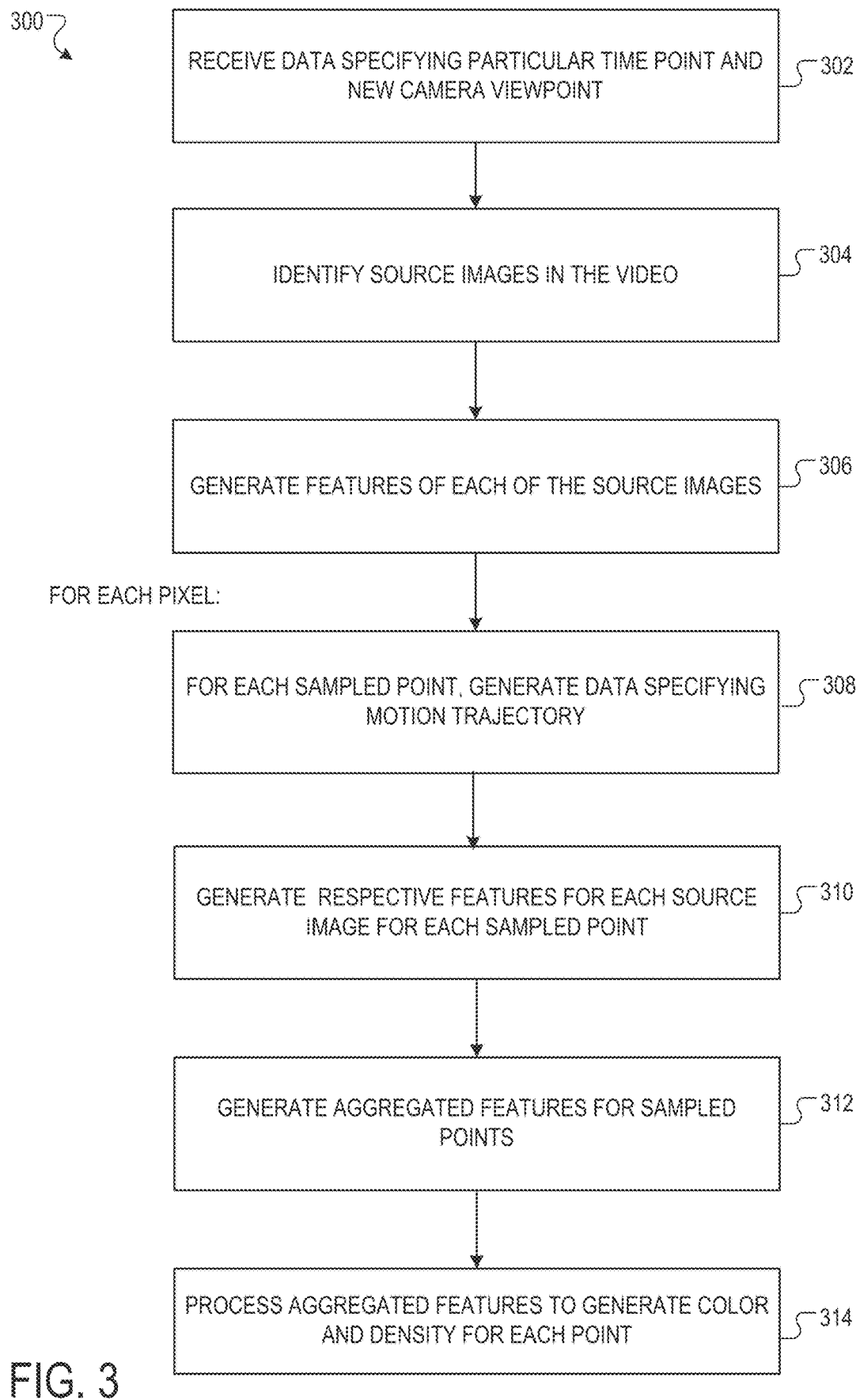
FIG. 3 is a flow diagram of an example process for rendering a new image at a particular time point and from a new camera viewpoint.

FIG. 3 is a flow diagram of an example process 300 for rendering a new image at a particular time point in a video and from a new camera viewpoint. For convenience, process 300 will be described as being performed by a system of one or more computers located in one or more locations. For example, an image rendering system, e.g., the system 100 in FIG. 1, appropriately programmed in accordance with this specification, can perform the process 300.

The system receives data specifying the particular time point and the new camera viewpoint (step 302). The particular time point is generally one of the time points in the video. When the system is required to generate an image for a fractional time point, the system can perform the process 300 for the two particular time points that are closest to the fractional time point in the video, as will be described below.

The system identifies source images within the video based on the particular time point (step 304). For example, the system can identify, as a source image, each image that is within a temporal radius of the particular time point.

The system generates respective features of each of the source images (step 306). For example, the system can process each source image using an encoder neural network, e.g., a convolutional neural network or a vision Transformer (ViT) neural network, to generate features of the source image. The features for any given source image can be represented as a 2D feature map that includes a respective feature vector for each of a plurality of spatial regions in the given source image.

The system then generates the new synthesized image using the particular time point, the new camera viewpoint, the source images, the features for the source images, and the camera parameters for the source images.

More specifically, each pixel in the new synthesized image can be associated with a ray that projects into the scene from an image plane of the camera at the new camera viewpoint. The direction and position of a ray corresponding to a pixel in the new image can be computed as a predefined function of the parameters of the camera, e.g., the position and orientation of the camera, the focal length of the camera, and so on, given the new camera viewpoint of the camera at the particular time point.

The ray r(t) for a given pixel can be represented as:

$$r(t) = o + td,$$

where t is a distance along the ray, o is the origin of the ray, e.g., as specified by the new camera viewpoint, and d is the viewing direction corresponding to the pixel.

To generate the color for a given pixel in the image, the system can sample a plurality of points along the ray and along the viewing direction that corresponds to the pixel. For example, the system can randomly sample distances t along the ray to yield, for each sampled distance t, a sampled three-dimensional point x(t).

The system can use the view synthesis model to generate, for each sampled point, a respective color and a respective volume density.

The system then generates the final color for the pixel using the colors and volume densities for the sampled points. For example, the system can accumulate the colors for the sampled points using weights that are computed based on their corresponding volume densities. As a particular example, the final output color $c_{out}$ for a given pixel when there are N sampled points can be equal to:

$c_{out} = \Sigma_{i=1}^{N} w_i c_i$, where $c_i$ is the color computed for point i, $w_i = T_i(1-e^{-\Delta_i \sigma_i})$, $T_i = \exp(-\Sigma_{j<i} \Delta_j \sigma_j)$, and $\Delta_i = t_i - t_{i-1}$.

In some implementations, rather than directly using the randomly sampled distances t to generate the final set of points that are used to compute the output color, the system can iteratively resample points by treating the weights $w_i$ as a probability distribution to better concentrate samples in areas of high density.

In particular, the system can generate the color for each pixel, i.e., for each ray, using motion-adjusted feature aggregation from the source images. Performing motion-adjusted feature aggregation can allow the system to accurate account for dynamic objects in the scene when generating the new image.

In particular, to generate the color for a given pixel using motion-adjusted feature aggregation, the system performs the following steps.

That is, the system performs the remaining steps of the process 300 for each pixel in order to generate the color for the pixel.

For each sampled point along the ray, the system generates data specifying a motion trajectory of the sampled point across the time window spanned by the source images (step 308).

For example, the system can represent the motion trajectory of the sampled point in terms of learned basis functions. That is, the data representing the motion trajectory can include respective basis coefficients $\phi_i^l(x)$ for each of L bases, with L being a fixed number, e.g., equal to 4, 6, 10, or 12, and the coefficients for each basis including a respective coefficient for each coordinate of the sampled point, i.e., respective coefficients for each of x, y, and z.

In particular, the system can encode the trajectory coefficients using a first neural network $G_{MT}$ within the view synthesis model. For example, the first neural network can process a positional encoding of the sampled point and of the particular time point to generate the basis coefficients for the sampled point:

$\{\phi_i^l(x)\}_{i=1}^L = G_{MT}(\gamma(x), \gamma(i))$, where i is the particular time point, x is the sampled point, and $\gamma(\cdot)$ represents a positional encoding function. For example, the positional encodings can be represented using increasing frequencies, e.g., linearly increasing frequencies.

Optionally, the system can also learn, as part of the training of the view synthesis model, a respective global learnable motion basis $h_i^l$ for each of the L bases that spans every time point within in the input video. This basis is referred to as "global" because it does not depend on the sampled point or the time point.

Thus, the motion trajectory of the sampled point that maps the point x to a position at any given time j can be defined in terms of the basis coefficients as $\Gamma_{x,i}(j) = \Sigma_{i=1}^L h_j^l \phi_i^l(x)$ and the relative displacement between the sampled point and its 3D correspondence $x_{i \to j}$ at time j is computed as $\Delta_{x,i}(j) = \Gamma_{x,i}(j) - \Gamma_{x,i}(i)$. Similarly, the corresponding 3D point at time j $x_{i \to j}$ can be represented as $x_{i \to j} = x + \Delta_{x,i}(j)$.

The first neural network can have any appropriate neural network architecture, e.g., a multi-layer perceptron (MLP) or other appropriate architecture.

The system uses the motion trajectory to generate, for each source image, respective features for the sampled point (step 310).

In particular, the system determines, for each source image, the corresponding 3D point for the sampled point at the time point of the source image, e.g., computes $x_{i \to j} = x + \Delta_{x,i}(j)$, where j is the time point j of the source image.

The system then projects the corresponding 3D point into the source image using the camera parameters for the source image to yield a projected 2d pixel location within the source image. The system can then extract the color of the 2d pixel location within the source image and the feature vector for the 2d pixel location from the features of the source image.

The system generates aggregated features for the sampled point from the features for the sampled point for each of the source images (step 312).

For example, the system can process the features for the sampled point using a second neural network within the view synthesis model to generate the aggregated features for the sampled point. The second neural network can be, for example, a shared multi-layer perceptron (MLP) followed by a pooling operation, e.g., a weighted average pooling operation or other pooling operation, that generates the aggregated feature vector from the outputs of the MLP for each of the source images. That is, the second neural network can, for each source image, process the features of the sampled point for the source image using the MLP to generate an output for the source image. The second neural network then applies the pooling operation to the outputs of the second neural network for the source images to generate the aggregated features.

The system processes the aggregated features for the sampled points along the ray to generate a respective color and density for each of the sampled points (step 314).

As one example, the system can process the aggregated features using a third neural network within the view synthesis model to generate the colors and densities for the sampled points. For example, the third neural network can be a Transformer neural network (referred to as a "ray Transformer" neural network) that receives the aggregated features as input and generates the colors and densities for the sampled points. The ray Transformer neural network can include one or more self-attention layers that each perform self-attention to update the aggregated features and an output sub-network that processes the updated aggregated features generated by the last self-attention layer for each sampled point to the generate the color and density for the sampled point. Optionally, the ray Transformer can also receive as input a positional encoding of the given time point. Further optionally, the ray Transformer can also receive as input a global spatial coordinate embedding corresponding to the pixel.

The system then uses the colors and densities for the sampled points to generate the final color for the ray (and, accordingly, for the corresponding pixel).

In some implementations, the system can then generate a final pixel color for the ray directly from the colors and densities for the sampled points, e.g., as described above.

In some other implementations, the system can model the scene using two separate representations. Dynamic content within the scene can be modeled using motion-adjusted feature aggregation as described above, while static content within the scene can be modeled using a time-invariant model.

For example, for the time-invariant model, the system can perform the same processing described above for the motion-adjusted feature aggregation, but can aggregate the multi-view features without scene motion adjustment, i.e., along epipolar lines. That is, the system can perform the steps above but can extract features from the source images using the sampled point x instead of using the corresponding 3D point $x_{i \to j}$ because the point is assumed to be static rather than in motion.

In some implementations, the system learns separate parameter values for the second neural network and the ray Transformer neural network, i.e., one set of parameters for making static predictions and one set of parameters for making dynamic predictions. In other implementations, the parameter values are shared for both static and dynamic predictions.

In some cases, static objects may only be observed in spatially distant frames within the video, e.g., due to uncontrolled camera paths. Thus, limiting the source images to those that are within the temporal radius of the particular time point may not provide sufficient context to accurately render static objects. To account for this, in some implementations, the system selects the source images differently for the static predictions and for the dynamic predictions. For example, rather than selecting the source images as described above for the dynamic predictions, the system can use a larger radius. As another example, the system can sub-sample images at regular intervals from the entire video or from the frames that are within a larger radius of the give time point to generate a set of candidates and then select the source views based on, e.g., how close each candidate image is to the new viewpoint in terms of camera baseline.

To generate the final color of the pixel, the system can combine the dynamic and static predictions for a given pixel to yield a single output color. For example, the system can predict respective colors and densities for the sampled points for both static and dynamic predictions and then combine them into a final color as the alpha composite of both the static and the dynamic components, as described in Li, et al, Neural Scene Flow Fields for Space-Time View Synthesis of Dynamic Scenes, arXiv:2011.13084.

During training, the system can optionally also render static and dynamic colors for the pixel separately, e.g., when necessary for computing losses that are used during training.

In some cases, using only frames within the local radius when computing the dynamic colors can produce sub-optimal results, e.g., if camera and object motions are mostly colinear, or scene motions are too fast to track. In some implementations, to account for this, the system can synthesize additional images at randomly sampled viewpoints that are nearby existing time points in the video, e.g., as determined using estimated depths. During rendering of a new image at a given time point, the system can include one or more of these virtual images in the set of source images, e.g., by randomly sampling one or more of the neighboring virtual images that are nearby the given time point.

In some cases, the system can perform the above process as part of generating a new image at a specified target fractional time point, i.e., one that is between two existing time points in the video.

To generate a new image at a fractional time point, the system can predict the volumetric density and color at the two nearby input times, i.e., the two existing time points that immediately neighbor the fractional time point, by aggregating local image features from their corresponding set of source views as described above.

The system can then use the predicted colors and densities for the two nearby input times to generate the final colors in the image at the fractional time point. For example, the system can splat and linearly blend the predicted color and density from the two nearby times according to the scene flow derived from the motion trajectories and weighted according to the target fractional time index to generate the final color for the pixel.

Figure 4:
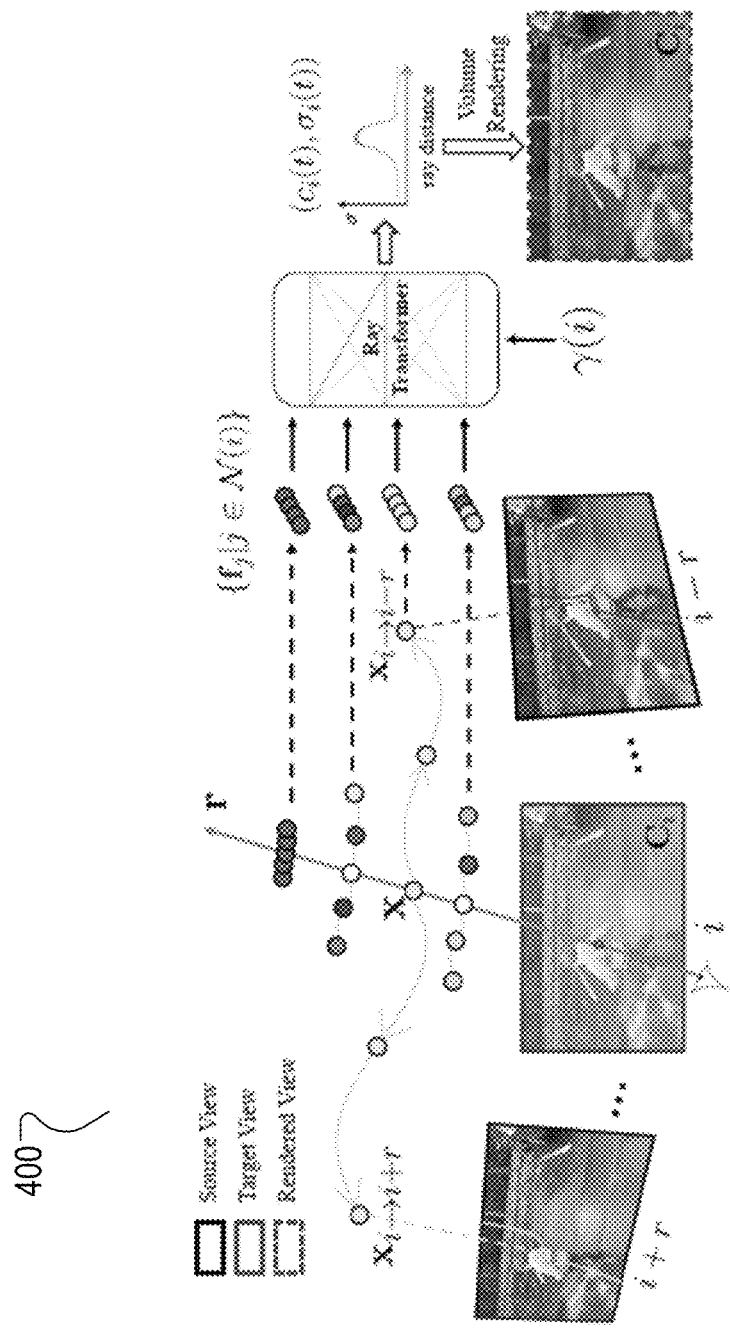
FIG. 4 shows an example of performing motion-aware feature aggregation.

FIG. 4 shows an example 400 of performing motion-aware feature aggregation.

As shown in the example 400, the system is generating a rendered image ("rendered view") at time i using a set of source images N from the video that includes the images at times i+r and i−r. Because the example 400 is performed during training, the system has access to a target view at time i. However, the same process can be used to generate new images from new viewpoints after training.

For a given pixel in the new image, the system samples points along a ray r that include the point x. The system uses the motion trajectory for the point to determine, among others, $x_{i \to i+r}$ and $x_{i \to i-r}$ and then uses the features for the points $x_{i \to i+r}$ and $x_{i \to i-r}$ to generate aggregated features for the sampled point x. The system then processes the aggregated features for all of the sampled points along the ray r using the Ray Transformer to generate a respective color and density for each of the sampled points and uses volumetric rendering to determine the final color for the given pixel in the rendered view.

Figure 5:
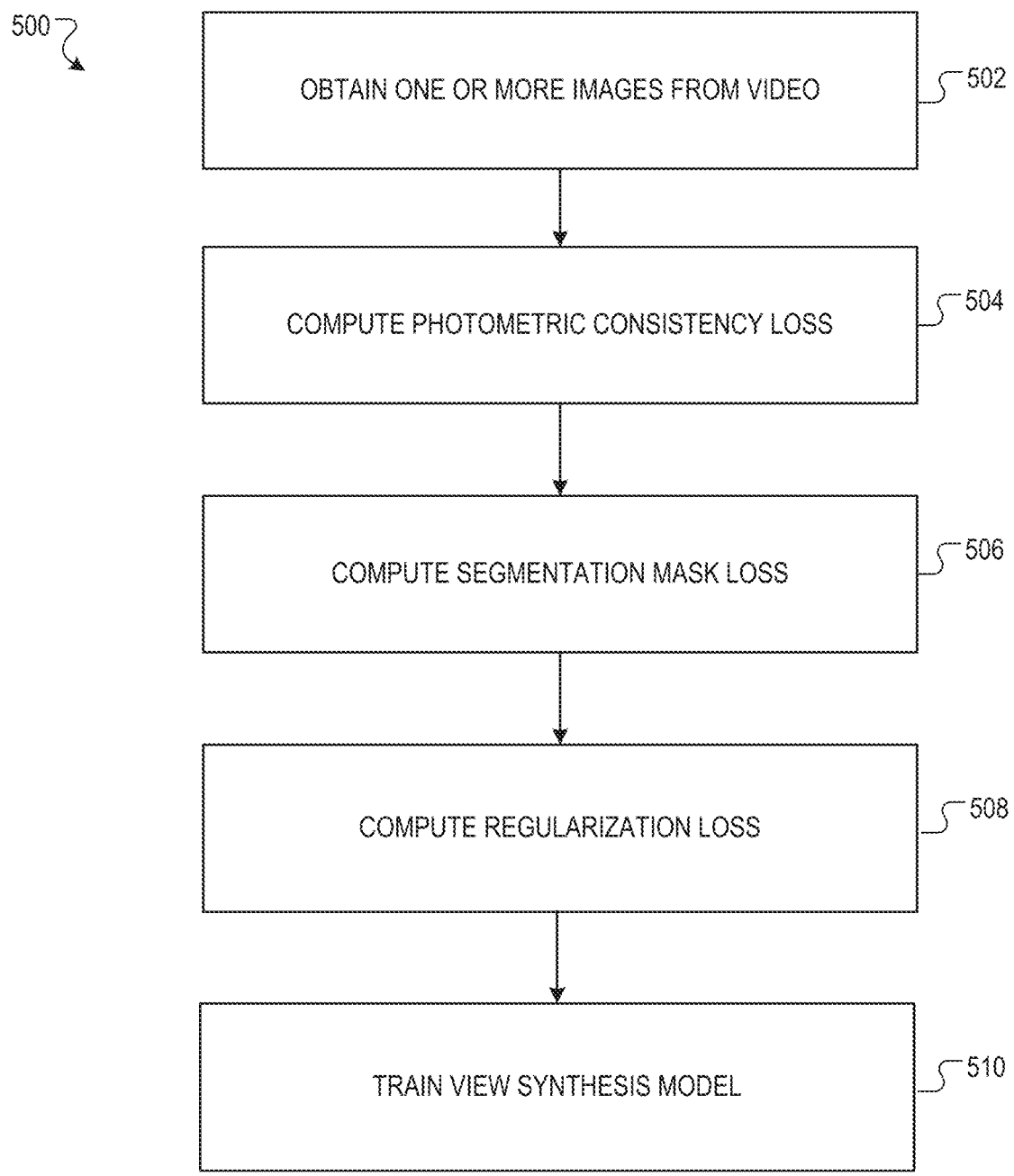
FIG. 5 is an example process for training the view synthesis model.

FIG. 5 is a flow diagram of an example process 500 for training the view synthesis model. For convenience, the process 500 will be described as being performed by a system of one or more computers located in one or more locations. For example, an image rendering system, e.g., the system 100 in FIG. 1, appropriately programmed in accordance with this specification, can perform the process 500.

For example, the system can perform the process 500 to train the various models used by the view synthesis model, e.g., the first neural network, the second neural network, and the third neural network. When the global bases are used, the system also learns the global bases as part of the process 500.

Optionally, the system can also train the encoder neural network as part of the process 500. In other cases, however, the encoder neural network has been pre-trained, e.g., on a visual representation learning task or as part of a classification neural network or other neural network that performs a different computer vision task.

The system can repeatedly perform the process 500 on sets of one or more images from the video that has been received as input by the system.

The system obtains, e.g., randomly samples, one or more images from the video (step 502).

For each obtained image, the system computes a photometric consistency loss (step 504).

More generally, in some implementations, the system can train the model by optimizing a photometric loss by comparing the final color for each pixel in a synthesized version of the image with the color of the pixel in the ground truth version of the image, i.e., generated as described above with reference to FIG. 3.

However, by doing so, the model might overfit to the input images in the video: it might perfectly reconstruct those views, but fail to render correct novel views. This can occur because the representation has the capacity to reconstruct completely separate models for each time instance, without utilizing or accurately reconstructing scene motion.

Therefore, to recover a consistent scene with physically plausible motion, the system can enforce temporal coherence of the scene representation using a photometric consistency loss.

One way to define temporal coherence in this context is that the scene at two neighboring times i and j should be consistent when taking scene motion into account. In particular, the system can enforce temporal photometric consistency in the optimized representation, i.e., in the trained view synthesis model, via cross-time rendering in motion-adjusted ray space.

At a high-level, the system renders a view at time i but via some nearby time j, which is referred in this specification as "cross-time rendering."

For each nearby time j that corresponds to one of the source images for the obtained image at time I, rather than directly using points x along ray r as described above, the system considers the points $x_{i \to j}$ along a motion-adjusted ray $r_{i \to j}$ and treats them as if they lie along a ray at time j.

Specifically, having computed the motion-adjusted points $x_{i \to j}$, the system queries the first neural network to predict the coefficients of new trajectories $\phi_i^j(x_{i \to j})$, and uses these to compute corresponding 3D points for the source images k as described above. These new 3D correspondences are then used to render a pixel color for a "straight" ray as described above with reference to FIG. 3, except now along the curved, motion-adjusted ray $r_{i \to j}$. That is, each point $x_{(i \to j)_{j \to k}}$ is projected into its corresponding source image and feature maps $F_k$ with camera parameters $P_k$ to extract a color and image feature $f_k$ for the sampled point. The system then aggregates these features as described above and processes the aggregated features using the third neural network with the time embedding for time j as described above.

The result is a sequence of colors and densities, which the system can composite through volume rendering to form a color as described above. The system can then compare this color with the target pixel via a motion-disocclusion-aware RGB reconstruction loss:

$$L_{pho} = \Sigma_r \Sigma_{j \in \kappa(i)} \hat{W}_{j \to i}(r) \rho(C_i(r), \hat{C}_{j \to i}(r))$$

where $\kappa(i)$ is the set of source images for the image at time i, $\rho$ is an RGB loss between the actual color $C_i(r)$ at the pixel corresponding to ray r and $\hat{C}_{j \to i}(r)$ the color generated for the pixel corresponding the ray r by using cross-time rendering for source image j as described above, $\hat{W}_{j \to i}(r)$ is a motion disocclusion weight computed by the difference of accumulated alpha weights between time i and j to address motion disocclusion ambiguity. One example of computing such a weight is described in Li, et al, Neural Scene Flow Fields for Space-Time View Synthesis of Dynamic Scenes, arXiv: 2011.13084.

For example, the system can use a generalized Charbonnier loss for the RGB loss $\rho$.

Note that when j=i, there is no scene motion-induced displacement and no disocclusion weights are involved.

When the scene is represented as two representations, one for static and one for dynamic. the photometric consistency term becomes:

$$L_{pho} = \Sigma_r \Sigma_{j \in \kappa(i)} \hat{W}_{j \to i}(r) \rho(C_i(r), \hat{C}_{j \to i}^{full}(r)),$$

where $\hat{C}_{j \to i}^{full}(r)$ is computed by combining the color generated for the pixel corresponding the ray r by using cross-time rendering for source image j as described above and a static color computed for the same pixel, as also described above.

For each image, the system can optionally compute one or more optional losses.

That is, the system can optionally employ one or more optional losses to improve the optimization of the view synthesis model.

For each input image, the system computes an optional segmentation mask loss (step 506) that makes use of image-based motion segmentation.

In particular, in some cases, without any initialization, scene factorization can be dominated by either the time-invariant or the time-varying representation. To account for this, system can use a motion segmentation module that produces segmentation masks for supervising the two-component scene representation.

In particular, before training the two-component scene representation, the system jointly trains two models to obtain a motion segmentation mask $M_i$ for each input image in the video.

For example, the system can model static scene content with an IBRNet that renders an image $\hat{B}_i^{st}$ using volume rendering along each ray via feature aggregation along epipolar lines from nearby source views without considering scene motion. IBRNets are described in more detail in Qianqian Wang, Zhicheng Wang, Kyle Genova, Pratul P Srinivasan, Howard Zhou, Jonathan T Barron, Ricardo Martin-Brualla, Noah Snavely, and Thomas Funkhouser. Ibrnet: Learning multi-view image-based rendering. In Proc. Computer Vision and Pattern Recognition (CVPR), pages 4690-4699, 2021.

The system can model dynamic scene content with a neural network, e.g., a 2D convolutional encoder-decoder network D, which predicts a 2D opacity map $\alpha_i^{dy}$, confidence map $\beta_i^{dy}$, and RGB image $\hat{B}_i^{dy}$ from an input image.

During training of these two models, the system can generate a full reconstructed image $\hat{B}_i^{full}$ by compositing pixelwise from the outputs of the two models using the 2D opacity map $\alpha_i^{dy}$, confidence map $\beta_i^{dy}$, RGB image $\hat{B}_i^{dy}$ and the image $\hat{B}_i^{st}$. To segment moving objects, the system can assume the observed pixel color is uncertain in a heteroscedastic aleatoric manner and model the observations in the video with a Cauchy distribution with time dependent confidence.

By taking the negative log-likelihood of the observations, the system can train these models with a segmentation loss that can be represented as a weighted reconstruction loss:

$$L_{seg} = \sum_r \left( \beta_i^{dy}(r) + \frac{\left\| \hat{B}_i^{full}(r) - C_i(r) \right\|^2}{\beta_i^{dy}(r)} \right)$$

By optimizing the two models using the above loss, the system can obtain a motion segmentation mask $M_i$ after the training has been completed by thresholding $\alpha_i^{dy}$ at 0.5, with pixels having opacities above threshold being static.

For the training of the view synthesis model, the system can then initialize the time-varying and time-invariant models with masks $M_i$ by applying a reconstruction loss to renderings from the time-varying model in dynamic regions, and to renderings from the time-invariant model in static regions:

$$L_{mask} = \sum_r (1 - M_i)(r) \rho\left(\hat{C}_{j \to i}^{st}(r), C_i(r)\right) + \sum_r M_i(r) \rho\left(\hat{C}_{j \to i}^{dy}(r), C_i(r)\right),$$

where $\hat{C}_{j \to i}^{st}(r)$ is the static rendered color and $\hat{C}_{j \to i}^{dy}(r)$ is the dynamic rendered color.

For each input image, the system computes an optional regularization loss (step 508). For example, the system can use the regularization loss to avoid the optimization of the view synthesis becoming stuck in a bad local minimum. For example, the regularization loss can include one or more of: (i) a data regularization loss that uses monocular depth consistency priors and optical flow consistency priors to regularization training, (ii) a motion trajectory regularization term that encourages estimated trajectory field to be cycle-consistent and spatial-temporally smooth, or (iii) a compactness prior loss that encourages the scene decomposition to be binary, e.g., using an entropy loss, and mitigates floaters, e.g., through distortion losses. In the case that the regularization loss includes multiple individual losses, the regression loss can be computed as the sum of the individual losses.

The system trains the view synthesis model using the photometric consistency loss and, when used, the one or more optional losses (step 510).

For example, for each learnable parameter of the view synthesis model, e.g., for each parameter of each neural network that is being trained as part of the view synthesis model and for each global basis coefficient, the system can compute a respective gradient with respect to the parameter of a loss function that combines the photometric consistency loss and the optional loss(es) and then update the parameter by applying an optimizer to the gradient and the current value of the parameter. For example, the loss function can be a sum or a weighted sum of the photometric consistency loss and the optional loss. When there are multiple images in the set, the loss function can be the average or the weighted sum of the losses for each of the images.

Figure 6:
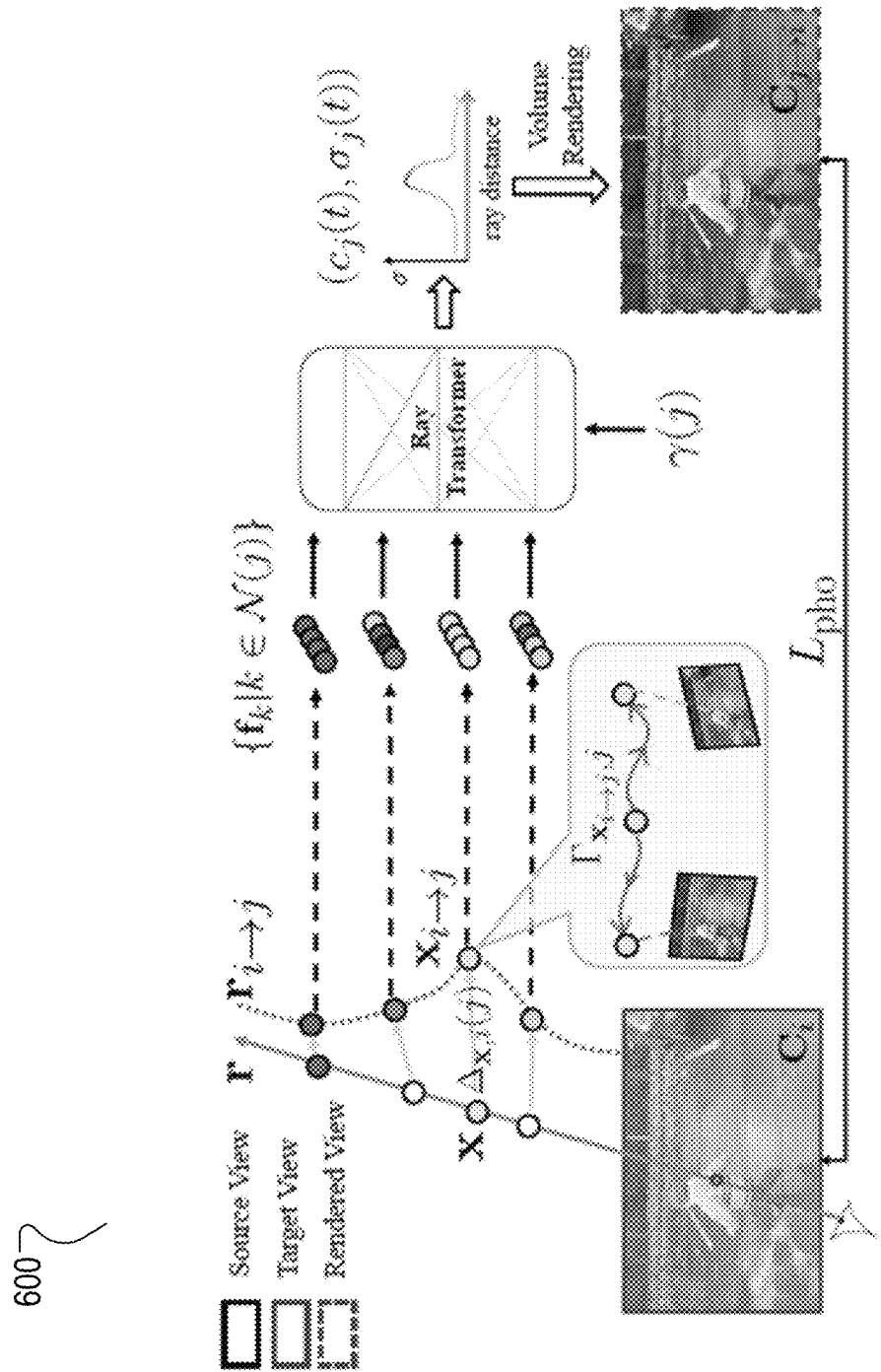
FIG. 6 shows an example of performing cross-time rendering during training.

FIG. 6 shows an example 600 of performing cross-time rendering during training.

In particular, example 600 shows the computation of the loss between the source view at time i and a cross-time rendered view from source image j. As can be seen from FIG. 6, the system computes the color for the given pixel in the image that corresponds to ray r in the same manner as described above with reference to FIG. 4, except using sampled points along the curved, motion-adjusted ray $r_{i \to j}$ instead of points sampled along ray r.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    receiving a video of a scene comprising a plurality of images at respective time points;
    receiving a query specifying a particular time point and a new camera viewpoint; and
    generating, using a view synthesis machine learning model and the video of the scene, a new image of the scene that appears to be taken from the new camera viewpoint at the particular time point, comprising:
        generating, based on the particular time point, a set of source images that comprises one or more images from the video;
        generating respective features for each of the source images;
        for each of a plurality of pixels of the new image:
            sampling a plurality of three-dimensional points along a ray corresponding to the pixel;
            for each sampled point, generating, using a first neural network within the view synthesis machine learning model, data defining a motion trajectory of the sampled point around the particular time point;
            generating, from the respective features for the source images, respective features for each of the sampled points using the data defining the motion trajectory of the sampled point; and
            generating, from the respective features of each of the sampled points, a final color of the pixel in the new image.

2. The method of claim 1, further comprising:
    providing the new image for presentation.

3. The method of claim 1, wherein generating the set of source images comprises:
    identifying, as source images, each image that is at a respective time point that is within a temporal radius of the particular time point.

4. The method of claim 1, wherein generating respective features for each of the source images comprises, for each source image, processing the source image using an encoder neural network.

5. The method of claim 1, wherein generating, using a first neural network within the view synthesis machine learning model, data defining a motion trajectory of the sampled point around the particular time point comprises:
    processing an input comprising a positional encoding of the sampled point and a positional encoding of the particular time point using the first neural network to generate respective coefficients for each of a plurality of basis functions that define the motion trajectory.

6. The method of claim 5, wherein the motion trajectory is defined by the respective coefficients for the basis functions and a respective global coefficient for each of the basis functions that is independent of the particular time point and the sampled point and that is learned during the training of the view synthesis machine learning model.

7. The method of claim 1, wherein generating, from the respective features for the source images, respective features for each of the sampled points using the data defining the motion trajectory of the sampled point comprises:
    for each source image, identifying using the motion trajectory of the sampled point, a corresponding pixel location in the source image; and
    for each source image, generating the respective features for the sampled point from a color of the corresponding pixel location in the source image and a feature vector corresponding to the corresponding pixel location in the respective features for the source image.

8. The method of claim 7, wherein generating, from the respective features of the sampled points, a final color of the pixel in the new image further comprises:
    generating an aggregated feature for the sampled point from the respective features for the sampled point for each of the source images.

9. The method of claim 8, wherein generating an aggregated feature for the sampled point from the respective features for the sampled point for each of the source image comprises:
    for each source image, processing the respective features for the sampled point for the source image using a second neural network within the view synthesis machine learning model to generate an output; and
    applying a pooling operation to the outputs for the source images to generate the aggregated features.

10. The method of claim 1, wherein generating, from the respective features of each of the sampled points, a final color of the pixel in the new image comprises:
    processing the respective features for the sampled points using a third neural network within the view synthesis machine learning model to generate a respective color and volumetric density for each sampled point.

11. The method of claim 10, wherein the third neural network is a Transformer neural network.

12. The method of claim 10, wherein generating, from the respective features of each of the sampled points, a final color of the pixel in the new image further comprises:
    generating a first color for the pixel from the respective colors and volumetric densities for the sampled points.

13. The method of claim 12, wherein generating, from the respective features of each of the sampled points, a final color of the pixel in the new image further comprises:
generating a second color for the pixel using a time-invariant model; and
combining the first and second colors to generate the final color of the pixel.

14. The method of claim 12, wherein generating a first color for the pixel from the respective colors and volumetric densities for the sampled points comprises:
applying volume rendering to the respective colors and volumetric densities for the sampled points to generate the final color.

15. The method of claim 1, further comprising:
prior to generating, using the view synthesis machine learning model and the video of the scene, the new image of the scene that appears to be taken from the new camera viewpoint at the particular time point:
training the view synthesis machine learning model on the images in the video of the scene to minimize a loss function.

16. The method of claim 15, wherein the loss function comprises a photometric consistency loss.

17. The method of claim 16, wherein the photometric consistency loss measures, for a given target image in the video and a given source image in the video and for each pixel in the given target image, an error between an actual color at the pixel in the given target image and a color generated at the pixel by cross-time rendering using the given source image.

18. The method of claim 15, wherein the loss function comprises a segmentation mask loss that uses a motion mask derived through image-based motion segmentation.

19. A system comprising one or more computers and one or more storage devices storing instructions that when executed by the one or more computers cause the one or more computers to perform operations comprising:
receiving a video of a scene comprising a plurality of images at respective time points;
receiving a query specifying a particular time point and a new camera viewpoint; and
generating, using a view synthesis machine learning model and the video of the scene, a new image of the scene that appears to be taken from the new camera viewpoint at the particular time point, comprising:
generating, based on the particular time point, a set of source images that comprises one or more images from the video;
generating respective features for each of the source images;
for each of a plurality of pixels of the new image:
sampling a plurality of three-dimensional points along a ray corresponding to the pixel;
for each sampled point, generating, using a first neural network within the view synthesis machine learning model, data defining a motion trajectory of the sampled point around the particular time point;
generating, from the respective features for the source images, respective features for each of the sampled points using the data defining the motion trajectory of the sampled point; and
generating, from the respective features of each of the sampled points, a final color of the pixel in the new image.

20. One or more non-transitory computer storage media storing instructions that when executed by one or more computers cause the one or more computers to perform operations comprising:
receiving a video of a scene comprising a plurality of images at respective time points;
receiving a query specifying a particular time point and a new camera viewpoint; and
generating, using a view synthesis machine learning model and the video of the scene, a new image of the scene that appears to be taken from the new camera viewpoint at the particular time point, comprising:
generating, based on the particular time point, a set of source images that comprises one or more images from the video;
generating respective features for each of the source images;
for each of a plurality of pixels of the new image:
sampling a plurality of three-dimensional points along a ray corresponding to the pixel;
for each sampled point, generating, using a first neural network within the view synthesis machine learning model, data defining a motion trajectory of the sampled point around the particular time point;
generating, from the respective features for the source images, respective features for each of the sampled points using the data defining the motion trajectory of the sampled point; and
generating, from the respective features of each of the sampled points, a final color of the pixel in the new image.

* * * * *